3,459,575
TITANIUM PIGMENT MANUFACTURE
Bertha M. Andrew, Wilmington, Del., and Karl E. Blumenberg, Baltimore, Md., assignors to E. I. du Pont de Nemours and Company, Wilmington, Del., a corporation of Delaware
No Drawing. Filed May 5, 1965, Ser. No. 453,485
Int. Cl. C09c *1/36, 3/00;* C01g *23/04*
U.S. Cl. 106—300                                         1 Claim

ABSTRACT OF THE DISCLOSURE

A process is provided for finishing pigmentary rutile $TiO_2$ to improve and enhance the color brightness by incorporating in an aqueous slurry of the $TiO_2$ pigment, from about 0.3% to about 20% by weight based on $TiO_2$, of a salt of a metal which deposits as a hydrous oxide onto the rutile when the aqueous slurry is neutralized, and maintaining the slurry subsequent to the incorporation and prior to the neutralization for at least 15 minutes under highly alkaline conditions in the pH range from 10 to 14.

---

This invention relates to titanium dioxide pigments and more particularly to improved $TiO_2$ pigments in rutile crystalline form. More specifically, the invention relates to novel methods for surface treating rutile $TiO_2$ pigments from a sulfate process hydrolysis in order to impart thereto superior color and other essential characteristics.

Titanium dioxide pigments can be obtained in either anatase or rutile crystalline form and are produced by a sulfate process as taught in U.S. Re. Patent 18,854 and U.S. 2,479,637 or by the oxidation of $TiCl_4$ alone or in conjunction with a small amount of $AlCl_3$, such oxidation being carried out with air or oxygen at a relatively high temperature ranging from about 800–1350° C. Useful oxidation processes comprise those described in U.S. 2,488,439 and 2,559,638. In sulfate processes, a solution of a soluble titanium salt, such as the sulfate, is hydrolyzed and the precipitated raw $TiO_2$ pigment hydrolysate which is recovered is then calcined to develop its essential pigment properties. Rutile is directly obtained by recourse to oxidation or the so called chloride process.

As is known, pigmentary rutile possesses the higher refractive index and greater potential hiding power. That form of pigment rather than anatase $TiO_2$ is considered more usefully attractive in commercial applications. Since the chloride process is accompanied with serious equipment corrosion problems due to chlorine use and presence, the sulfate process has remained commercially attractive for $TiO_2$ manufacture. This is because, among other reasons, the sulfate solutions employed therein can be readily prepared from the acid dissolution of ilmeinite or other titaniferous ore and are much less corrosive toward plant equipment. Additionally, rutile $TiO_2$ pigments competitive with those obtained in the chloride process can be produced from the sulfate process by utilizing, as disclosed in U.S. Patents 2,479,637 and 2,511,218, suitable nucleating or accelerating agents which will impart to the anatase raw pigment hydrolysate recovered the desirable property of converting to rutile upon being calcined at relatively low (750–1050° C.) temperatures comparable to those employed in anatase pigment manufacture.

$TiO_2$ pigments resulting from the sulfate or chloride process are wet finished or after-treated prior to use to enhance and stabilize various physical properties such as color, texture, durability, gloss retention, chalking, fading and weather resistance. Such treatment entails the coating or initimate association of the pigment with minor amounts of a suitable hydrous metal oxide or mixture and is conventionally effected by forming an aqueous, acidic (1–6 pH) slurry suspension of the pigment and precipitating the hydrous metal oxide from a salt solution of the metal which has been added to the slurry. Thus silica and alumina or titanium dioxide coatings can be applied to the pigment by incorporating a desired concentration of a solution of metal salts, such as a sulfate or chloride, in the acidic suspension, following which the pH of the slurry can be adjusted to substantial neutrality through addition of a base or alkaline precipitating agent such as ammonium hydroxide, sodium hydroxide, potassium hydroxide, etc. and the surface treated pigment recovered following dewatering and drying. Hydrous metal oxides useful in such finishing treatment as well as methods for their application include those described in U.S. Patents 2,269,470; 2,346,188; 2,378,790; 2,387,534; 2,357,721; 2,296,618; 2,671,031 and 2,212,135.

It has now been found that the properties of $TiO_2$, especially sulfate process rutile pigments can be enhanced and improved by recourse to the novel surface treatments herein contemplated. A salient object of this invention therefore is to provide improved finishing procedures for surface treating and coating of $TiO_2$ pigment particles whereby their color and other essential properties are desirably improved and stabilized. It is among the additional objects of this invention to provide improved sulfate process rutile type $TiO_2$ pigments surface coated with small amounts of a suitable white hydrous metal oxide or mixture of such oxides, particularly $Al_2O_3$ and $SiO_2$, to impart desired, essential color, durability and non-yellowing characteristics to the pigment and render such pigments the full equivalent of and competitive with identically treated chloride process pigments. Other objects and advantages of the invention will be apparent from the ensuing description.

In accordance with this invention, it has been found that by observing and maintaining more drastic, highly alkaline and critical conditions of pH in finishing-treating sulfate process rutile pigment particles with a hydrous metal oxide, especially of silica and alumina, a marked stabilizing effect on pigment color and other essential properties of the final pigment becomes assured with recovery of a rutile pigment equal in all respects to an identically finished rutile $TiO_2$ pigment obtained from the oxidation of titanium tetrachloride.

In wet finishing $TiO_2$ pursuant to the invention to effect coating thereof with alumina and silica for example, an aqueous slurry of the pigment is first formed and a soluble compound of the treating agents is then incorporated therein and the mixture aged under relatively high alkaline (pH of at least 10) conditions. Following desired aging, neutralization of the slurry is undertaken and recovery of the coated pigment is effected after conventional washing, drying and milling treatments.

Thus, in one specific adaptation, a calcined, pigment-developed rutile product obtained from the hydrolysis of a nucleated titanium sulfate solution pursuant to the teachings of U.S. Patents 2,479,637 or 2,511,218, is slurried with water in a suitable corrosion-resistant mixing vessel equipped with a stirrer or other means for agitating the slurry during treatment. The slurry can be at any desired solids content. Usually such content ranges from about 16–30% $TiO_2$ by weight. An alkaline source of $SiO_2$, such as sodium silicate, in amounts ranging preferably from about .5–3% by weight of the $TiO_2$, and an alkaline source of $Al_2O_3$, such as sodium aluminate, in amounts preferably equalling from about 1.75–6% by weight, based on the $TiO_2$, is then mixed with the suspension. To obtain better resistance to chalking in the final pigment, a source of soluble $TiO_2$, such as titanyl sulfate, in amounts ranging from about 0.5 to 5% by weight of the pigment, can be incorporated in the slurry. Such addition of acidic components is preferably undertaken prior to adjustment to high pH, and silicate and aluminate addition to the high pH slurry. During agent addition and aging, the slurry is preferably maintained at an elevated temperature, usually at from about 60–80° C. If desired, coder (down to say about 25° C.) or warmer (up to say about 90° C.) temperatures can be used. When the treatment is carried out in the cold (25° C.), however, it will be found desirable to heat the slurry to the indicated 60–80° C. temperatures prior to filtration so that production of a low moisture content of filter cake will be obtained from the filtration and formation avoided of thixotropic products.

Following addition of the treating agents, aging of the treated slurry for a period of at least 15 minutes under highly alkaline conditions, e.g. at a pH ranging from 10–14 is undertaken. Preferably, this is carried out for a period of from about 15–45 minutes while the slurry is maintained at a pH of 12–13. The longer the mixing and aging times resorted to the more desirable and complete will be the surface conditioning obtained. In imparting high alkalinity to the slurry any suitable alkaline material or mixture, such as alkali metal hydroxides or carbonates can be employed. Among examples of these NaOH, KOH, $Na_2CO_3$, $KHCO_3$, etc. can be mentioned.

Following precipitation and aging and prior to filtration, washing, drying and milling, acidification of the slurry to a pH of about 6.5–6.9 is undertaken through mineral or other acid addition. Preferably, acidifying agents such as sulfuric or hydrochloric acid are employed for this purpose. Conventional filtering, washing, drying and milling of the coated pigment product is then undertaken. In the milling opertion, the dried pigment can be ground in a ball mill, jet mill, micronizer or other desired fluid energy mill to remove undesired aggregates and reduce $TiO_2$ particle size to desired pigment texture and fineness. The final pigment, due to its high tinting strength, color, opacity, texture and other essential properties will be found to be readily useful in various pigmenting applications, including coating compositions, such as paints, enamels, lacquers and finishes, as a delusterant for synthetic fibers, such as nylon, rayon, etc., and as a pigmenting ingredient for inks, rubbers, plastics, etc.

To a clearer understanding of the invention, the following specific examples are given. These are illustrative only and are not to be construed as in limitation of the underlying principles and scope of the invention.

Example I

A rutile pigment obtained from the calcination of a rutile seeded precipitate recovered from the hydrolysis of a titanium sulfate solution in accordance with the methods described in U.S. Patent 2,479,637, was mixed with water to form a slurry suspension containing 100 parts of $TiO_2$ and 200 parts of water and the slurry was adjusted to a pH of 6.4. It was then treated with ¾ parts $SiO_2$ per 100 parts $TiO_2$ added a sodium silicate solution containing 200 parts per 1000 parts of $SiO_2$. After aging the solution under mild agitation for 30 minutes, the pH was adjusted to 12.2 with 50% sodium hydroxide and the slurry permitted to mix for 30 additional minutes. 4 parts $Al_2O_3$ per 100 parts $TiO_2$ contained in an aqueous solution of sodium aluminate containing 400 parts $Al_2O_3$ per 1000 parts of solution was then added to the slurry and mixing was continued for an additional 30 minutes. Thereafter the slurry was neutralized to a pH of 7.4 by means of sulfuric acid addition. The slurry was heated to 60° C. an readjusted to a pH of 6.9 by further sulfuric acid addition. The coated pigment product was then recovered from the slurry by recourse to conventional filtering, washing, drying and micronizing. Its color brightness value was found to be approximately 4 points better than a product obtained from an acid treated $Al_2O_3$–$SiO_2$ sulfate process pigment resulting from the treating procedures described in U.S. 2,387,534 which exhibited a color value of 15 in accordance with an arbitrary scale used in color grading similar to that described in U.S. Patent 2,780,558, using a colorless oil paste of the pigments drawn down on white paper or porcelain, and wherein a value of 12 constitutes a minimun for a good white pigment.

Example II

A rutile $TiO_2$ pigment obtained as described in U.S. 2,559,638 was admixed with water to provide a slurry containing 100 parts $TiO_2$ per 300 parts slurry. This slurry was treated with 1 part $TiO_2$ contained in titanyl sulfate. The pH of the slurry was then adjusted to 7.1 with ammonium hydroxide. Two parts $SiO_2$ was added as sodium silicate and the pH of the slurry was then adjusted to 12.2 with 50% sodium hydroxide solution. A sodium aluminate solution containing 37% $Al_2O_3$ was added until 4 parts of $Al_2O_3$ per 100 parts $TiO_2$ was reached. The slurry was adjusted to a pH of 10.0 with $H_2SO_4$, and heated to 60° C. for a period of 1 hour. The pH was then readjusted to 6.5 prior to undertaking filtration, washing, drying and micronizing. The color brightness of the pigment product of this example was 2 points better than that of a similar pigment treated in acid solution in accordance with the prior art.

Example III

A calcined sulfate process rutile pigment prepared as in Example I was slurried in water to obtain a suspension containing 25% $TiO_2$ and the slurry was heated to 65 to 80° C. To this slurry was added 1% $TiO_2$, as titanyl sulfate, 2% $SiO_2$, as sodium silicate, and 4% $Al_2O_3$, as sodium aluminate, in solutions as described in Example I. The pH of the slurry was then adjusted to 10.5 by NaOH addition and was maintained under this pH for 15 minutes after all the sodium aluminate had been added. The slurry pH was then adjusted to 6.5 to 6.7 with sulfuric acid, and was then filtered, washed, dried and micronized. The resulting pigment product exhibited a color brightness improvement of 1–2 points over that of the acid treated material.

Example IV

A slurry containing 425.0 gms./liter of a pigment prepared from the cooxidation of $TiCl_4$-$AlCl_3$ in accordance with the procedure of U.S. 2,559,638 was hetated to 60 ±5° C. To this was added 1.5 parts $SiO_2$ per 100 parts $TiO_2$ as sodium silicate solution and the slurry was allowed to age for 30 minutes at 60° C. Then 37% sodium aluminate solution was added until 3 parts of $Al_2O_3$ per 100 parts $TiO_2$ was obtained. The pH of the solution was above 11. This mixture was permitted to age at 60° C. for 15 minutes prior to neutralization. Thereafter, the slurry was filtered, and the recovered pigment was washed, dried and micronized in accordance with conventional pigment-finishing procedures.

Example V

A rutile $TiO_2$ pigment similar to that treated in Example I was mixed with water to form a slurry suspension containing from 300–325 gms./liter $TiO_2$. The pH of said slurry was adjusted to 12 by incorporating therein 50% NaOH. 1% $TiO_2$ as $TiOSO_4$ together with sufficient NaOH to maintain the slurry at a pH of 12 was then added. The slurry was then mixed through agitation for a period of 30 minutes. 0.75% $SiO_2$, as $Na_2SiO_3$ was then incorporated in the slurry with its pH remaining at 12. The resulting mixture was then agitated for an additional 30 minutes and 4% $Al_2O_3$ as $NaAl_2$ was added, the pH remaining at 12. Mixing of the slurry was continued for a further 30 minutes. The slurry was then neutralized to a pH of 7.0 by addition of sufficient $H_2SO_4$. It was then heated to 60° C. and held at that temperature for 60 minutes. Prior to filtration the slurry was readjusted to 7 pH by further $H_2SO_4$ addition. The surface treated pigment was then recovered from the slurry through filtration, washed, dried and micronized. Its color brightnes value was determined to be 3–5 points better than the prior art pigment referred to in Example I and in accordance with the arbitrary color grading scale referred to in that example.

The rutile titanium dioxide treatment herein contemplated has particular application to $TiO_2$ produced from chlorodie oxidation and sulfate process hydrolysis and can be applied to either straight or extended forms of $TiO_2$ pigment. Such extended forms can contain well-known extenders such as calcium sulfate, barium sulfate, silica, magnesium silicate, etc.

Although the invention has been illustratively described in its application to treatments involving the use of specific coating or treating agents it will be understood that it has general application to the surface treatment of rutile type pigments with any white, water, insoluble hydrate or oxide, or mixture, of a metal or metals the soluble salts of which hydrolyze in acid or alkaline solution to precipitate and intimately associate with or coalesce on the pigment an insoluble colorless metal oxide or hydrate. Particularly useful, and therefore preferred for surface treating in accordance with the invention, are hydrates or oxides of titanium, silicon or aluminum, or mixtures of such hydrates or oxides. These can be readily precipitated from their salt solutions, such as titanyl sulfate, titanium chloride, etc.; sodium aluminate, aluminum sulfate, aluminum chloride; sodium silicate, sodium fluosilicate, sodium metasilicate, potassium metasilicate, etc. Following filtration the treated pigment is washed to remove soluble salts, and then, as noted above, dried and dry or wet ground or pulverized prior to use.

While specific amounts of coating agents have been specified above as utilizable in the invention, these are merely preferred and due variance therefrom can be made without departing from the invention. Thus in lieu of the indicated 1.75–6% $Al_2O_3$ mentioned above amounts ranging from 1% to 10%, based on the $TiO_2$ are contemplated for use. Similarly while an amount of $SiO_2$ ranging from .5–3% has been mentioned, the amount of that reagent can range from 0.3% to 20%, based on the pigment, Likewise in lieu of the amount of $TiO_2$ coating agent mentioned above, such amount may vary from 0.3% to 10% based on the

We claim:

I claim:

1. A process for enhancing pigment color brightness in finishing sulfate process calcined pigmentary rutile $TiO_2$ comprising incorporating in an aqueous suspension of said pigment solutions containing .5–3% soluble $SiO_2$, and 1.75–6% soluble $Al_2O_3$, both based on the weight of the $TiO_2$, adjusting the pH of said suspension to the range of 12–13 and maintaining the resulting alkaline suspension in said pH range while at a temperature of 60–80° C. for a period ranging from 15 minutes to one hour, thereafter neutarilizing said suspension to a pH in the range of 6.5–7.5 and filtering, washing, drying and micronizing the resulting pigment product.

References Cited

UNITED STATES PATENTS

| | | | |
|---|---|---|---|
| 2,671,031 | 3/1954 | Whately | 106—300 |
| 2,885,366 | 5/1959 | Iler | 160—300 |
| 3,203,818 | 8/1965 | Rechmann et al. | 106—300 |
| 3,220,867 | 11/1965 | O'Shaughnessy | 106—308 |

FOREIGN PATENTS 671,179  9/1963  Canada.

TOBIAS E. LEVOW, Primary Examiner

H. M. S. SNEED, Assistant Examiner

U.S. Cl. X.R.

106—308